United States Patent [19]
Nowell et al.

[11] Patent Number: 5,560,639
[45] Date of Patent: Oct. 1, 1996

[54] MODULAR SQUATDOWN WHEELED SUSPENSION SYSTEM

[76] Inventors: Corbett W. Nowell, 1563 Karen Ave., Tulare, Calif. 93274; Charles P. Nowell, 1302 Adams St., Salinas, Calif. 93906; Freddie A. Tomlinson, 1562 Kern St., Tulare, Calif. 93274

[21] Appl. No.: 197,452

[22] Filed: Feb. 16, 1994

Related U.S. Application Data

[63] Continuation of Ser. No. 803,545, Dec. 9, 1991, abandoned.

[51] Int. Cl.⁶ .................................................... B60G 11/26
[52] U.S. Cl. .................... 280/704; 280/43.11; 280/43.17
[58] Field of Search ................................ 280/704, 43.17, 280/43.11, 848, 6.12, 715; 414/495; 180/276, 24.02

[56] References Cited

U.S. PATENT DOCUMENTS

| | | | |
|---|---|---|---|
| 3,113,686 | 12/1963 | Sundin | 414/495 |
| 3,477,738 | 11/1969 | Manning | 180/24.02 |
| 4,058,325 | 11/1977 | Schramm | 414/495 |
| 4,060,145 | 11/1977 | Kingman et al. | 280/43.17 |
| 4,434,998 | 3/1984 | Kaltwasser | 280/721 |
| 4,619,578 | 10/1986 | Routledge | 280/6.12 |
| 4,673,328 | 6/1987 | Shiels | 414/495 |
| 4,700,972 | 10/1987 | Young | 280/661 |
| 4,752,177 | 6/1988 | Zenna | 414/495 |
| 4,915,577 | 4/1990 | Fraser | 280/6.12 |
| 5,015,004 | 5/1991 | Mitchell | 280/704 |

*Primary Examiner*—Eric D. Culbreth
*Attorney, Agent, or Firm*—Sixbey, Friedman, Leedom & Ferguson

[57] ABSTRACT

A modular wheel assembly adapted to be mounted in parallel pairs on a vehicle having a load bearing bed, wherein each modular wheel assembly includes a wheel disposed on an axle, and further employs an air bag suspension system, including upper and lower brackets, the upper one of which is secured to the vehicle and the lower one of which is mounted to the axle by means of an intermediate link, and the modular wheel assembly being so configured that deflation of the air bag results in a lowering of the upper bracket below the axle of the wheel.

1 Claim, 6 Drawing Sheets

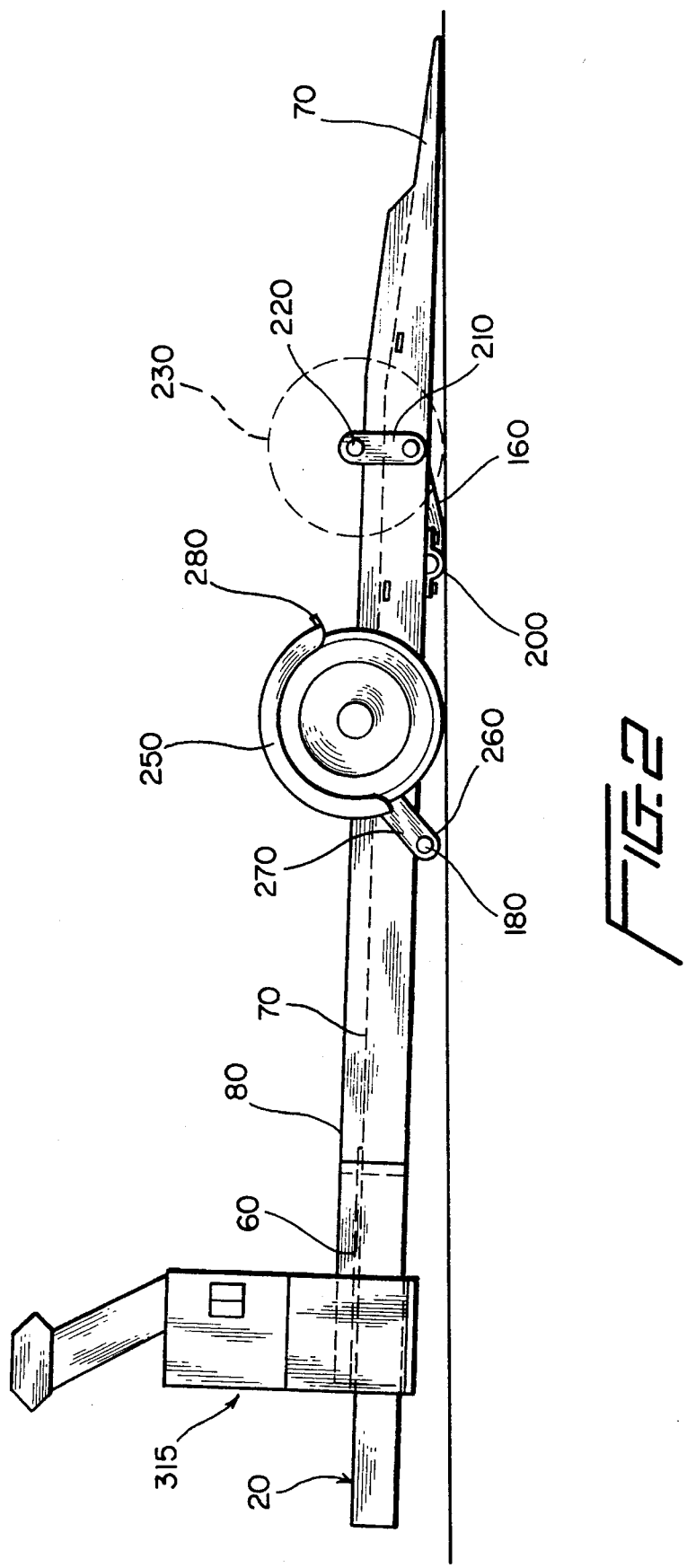

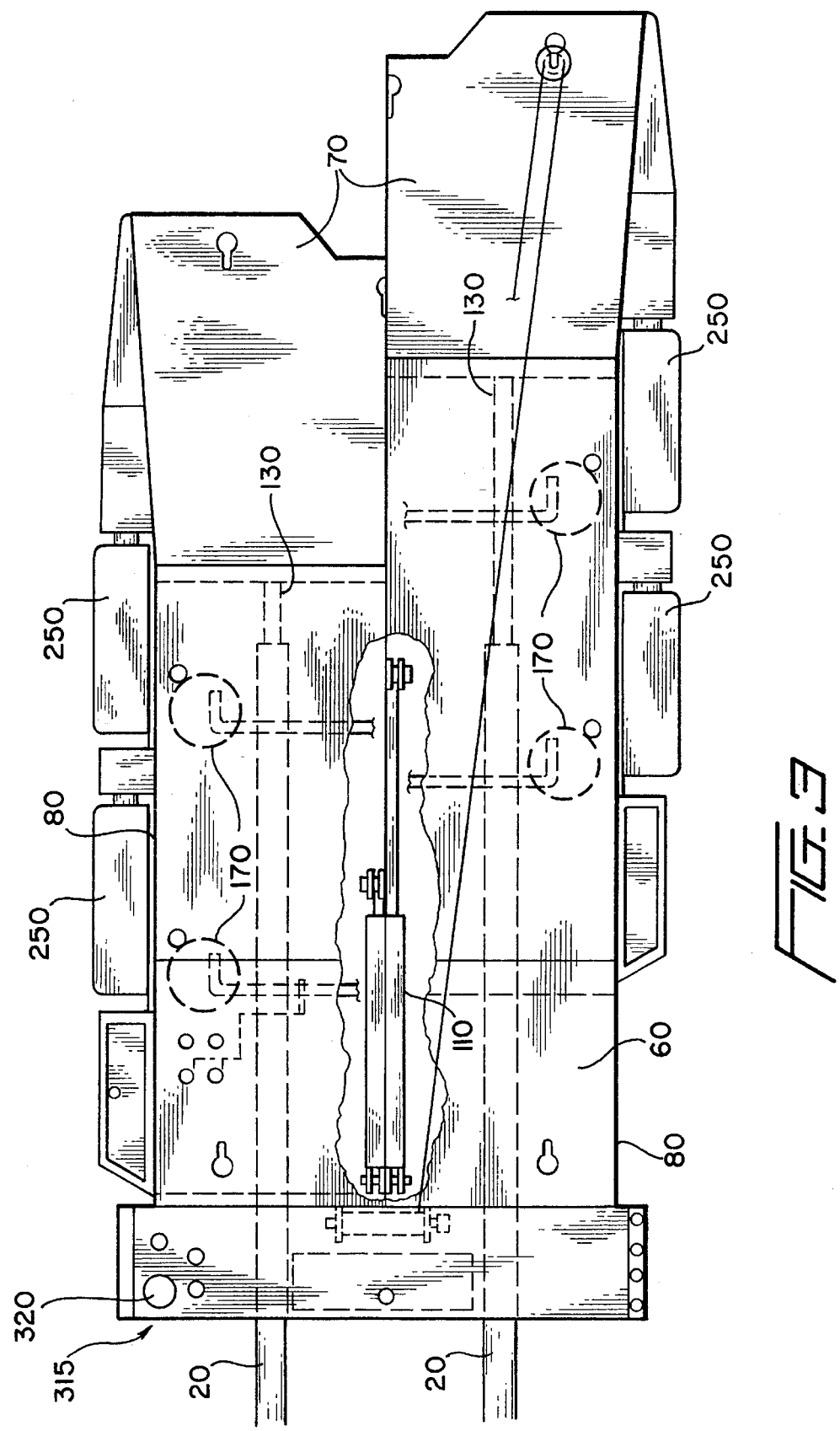

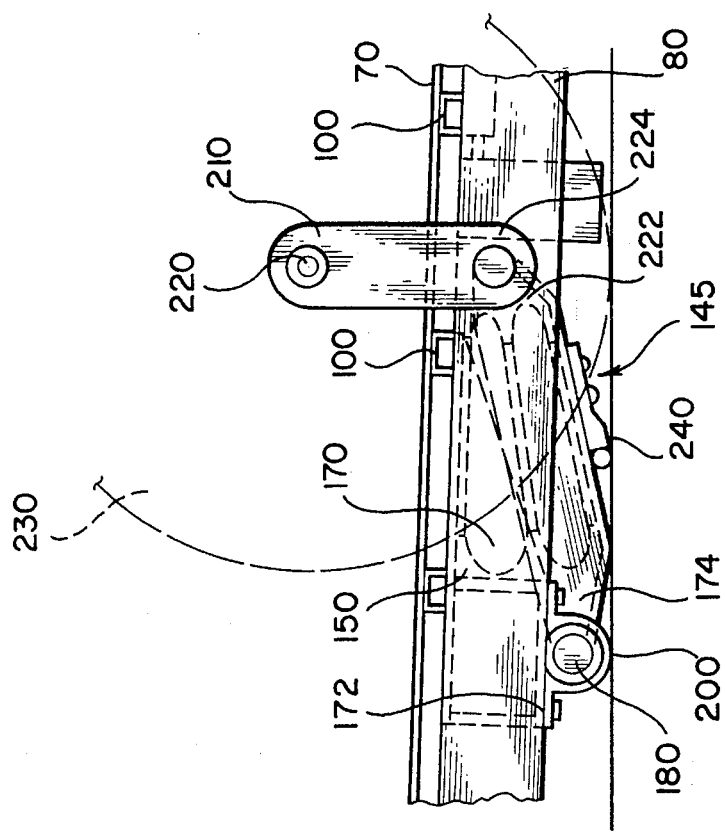
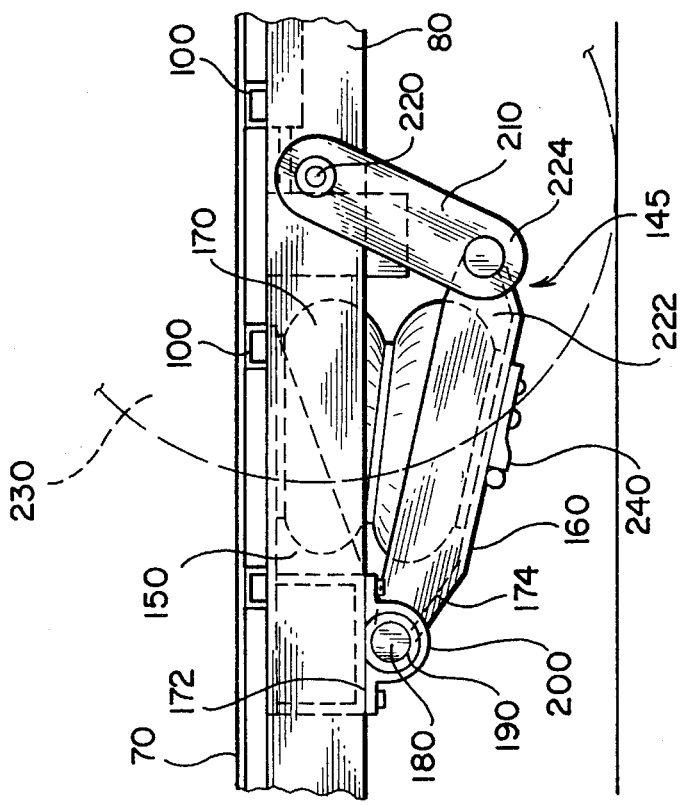

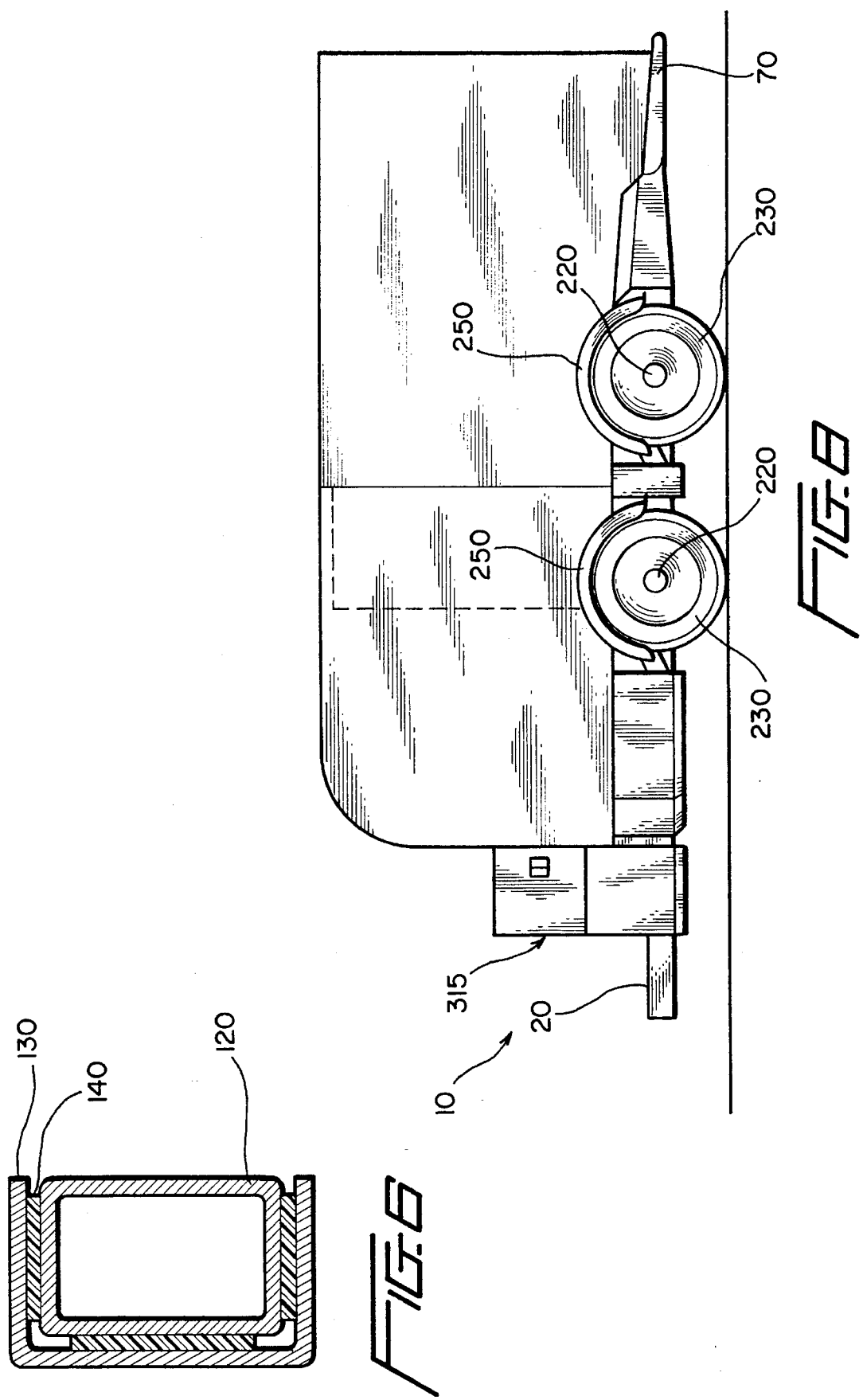

MODULAR SQUATDOWN WHEELED SUSPENSION SYSTEM

This application is a continuation of our application Ser. No. 07/803,545 filed Dec. 9, 1991 now abandoned.

BACKGROUND OF THE INVENTION

1. Field of Invention

Since the advent of horse drawn wagons, such vehicles have been used to transport cargo too bulky or too heavy to be carried by hand, wheel barrows or the like.

If the cargo to be transported was too heavy and it could not be hoisted to the bed of the wagon, the options were to use a ramp, or the wagon could be backed up to an elevated platform, known in more modern day parlance as a loading dock.

When wagons got motors and became trucks, they were faster, and more efficient, but loading and unloading cargo remained a problem.

Probably the next step in the evolution of the process of heavy cargo on and off loading, is the venerable fork lift. However, fork lifts can be dangerous and cumbersome in limited space and, of course, availability is a perpetual problem. A better system was needed.

Since loading docks and fork lifts, are not always available where needed, the lift gate was developed and mounted to the rear of the transport vehicle so that cargo could be loaded or unloaded no matter where the vehicle was located. However, lift gates are limited in size and capacity and, therefore, limited as to their usefulness.

The present invention seeks to obviate the several problems inherent in the loading and unloading of cargo through the ingenious process of bringing the vehicle to the cargo, rather than the cargo to the vehicle, as will become more clear hereinafter.

2. Description of prior Art

Previous paragraphs track a part of the evolution in loading and unloading practices which constitute, for the most part, the significant prior art. Nonetheless, the search continues to find a safe and efficient means of loading and unloading heavy, and/or bulky cargo, and it is generally accepted that the safest and most efficient way of accomplishing the desired result is not to have to lift or elevate the cargo onto the bed of the vehicle.

With this in mind, innovators such as Ives and Foster conceived the idea of tilting the bed of the vehicle, and they obtained U.S. Pat. Nos. 2,462,868 and 2,487,325 respectively, as a reward for their efforts.

In the '50's, air bags became the subject of considerable research and development, although primarily as a substitute for, or adjunct with, steel springs in a vehicle suspension. Seale, in his U.S. Pat. No. 2,784,978, envisioned the possibility of using air bags to level loads, or otherwise compensate for uneven load distribution.

In the early '70's, Pulgliese, in his U.S. Pat. No. 3,633,775, recognized the potential of air bags in lowering one end of the bed of a truck to make it easier to load cargo thereon, and Evans offered a variation on that theme by patenting his boat trailer [2,957,593]. These early efforts, however, were directed toward solving highly specialized problems and do not address the needs of the over the road cargo hauling industry . . . enter the present invention.

The cargo transportation industry, from recreational to industrial use, has been supplied by the motor vehicle manufacturing companies and trailer manufacturing companies with suspensions that attempt to hold the "bed" at a calibrated height up to the maximum weight capacities.

Originally, leaf-type springs were utilized to "soften" the ride, however, with little or no cargo the ride was quite jolting. Thereafter, inventors created several types of suspensions to create a softer ride by including a coil spring, and/or "shock absorber", air assisted "shocks", torsion bar suspension, air bag suspension system with a leveling valve. All of these "systems" were designed to "carry" the load, with some attempted driver and passenger comfort.

Another dilemma the transportation industry faced was the loading and unloading of cargo. At warehouses and large stores, "docks" were built to the height of the "bed" for easy removal and loading of box cars, trucks, and trailers. This was fine if the final destination was at another "dock", but generally the final destination was ground level and various inventions, such as the hydraulic tailgate, (a tailgate made in such a fashion as to become horizontal then lower hydraulically to ground level with or without a load and then return. This had to be operated with at least one hand while the other hand had to balance the load. It had the potential of being very hazardous and time-consuming.

Another was a "bed" that could be hydraulically moved in such a way as to have: a loading angle of 9 degrees to 20 degrees. Again, the problem was loading and unloading without damage to the cargo and immobilizing the cargo (tying down, securing). Another method was where the "bed" was hydraulically unloaded from the frame of the "chassis".

All of these methods had problems, such as inefficiency in time management, potential hazards to the operator in loading or unloading, and because of heavy suspension needed for the load when the vehicle was empty, the ride became harder and caused back injuries to the operator. Bigger or higher vehicles had to be made to handle the heavier loads and getting up and down from these vehicles made knees wear out before their time. Falling accidents also occurred more frequently.

Low-height "beds" were more efficient but ramps still had to be used and more space was required. Livestock balked at going up any type of ramp. Heavy springs caused laws to be passed in most states requiring the exercising of race horses every three to four hours of traveling because of possible hazards to their knee joints. Bed heights 40" and higher are dangerous because of the high center of gravity causing "tip overs" and "jack-knifing". Wind resistance is greater making it less economical.

The conventional "slide back" car carrier has become obsolete because of its high load angle. Auto manufacturers are "lowering" their cars, making them more aerodynamic, more efficient, etc. Because of the new four-wheel drive and four-wheel steering cars, tow trucks with wheel lift capabilities are not able to retrieve them economically either.

All the previous cargo vehicle designs heretofore known suffer from a variety of disadvantages, among them:

1. They are not for operator and/or passenger comfort and safety.
2. Fixed "bed" height, such that awkward and dangerous loading and unloading procedures are required.
3. Higher center of gravity subject to "tip over", "jack-knifing", etc.
4. Dock and ground level loading and unloading problems.
5. Roll back—slide back type car carriers have excessive load angles.

6. Excessive time required to prepare for loading or unloading and securing load.

SUMMARY OF THE INVENTION

The present invention provides an affordable alternative to the plethora of problems faced, on a daily basis, by those who, of necessity, or as part of their work, have need to transport cargo overland. Use of the present invention obviates loading docks, ramps and power tail gates, and the user knows that no matter what his destination, he can and will be unconcerned about the availability of any particular equipment for unloading cargo, since his vehicle will, when equipped with the system of the present invention, simply sit or squat down to permit unloading of the vehicle in complete safety, and with a minimum of effort.

Accordingly, several objectives are accomplished, and advantages achieved in the practice of the invention, among them, the following:

The provision of a modular combined wheel and suspension system, capable of original equipment or aftermarket installation, which will transform an otherwise cumbersome vehicle into a safe and useful device for transporting cargo overland to and from any location, without regard to the need for loading docks, ramps or power equipment for loading and unloading.

Similarly, the present invention, provides a novel suspension system having all of the features attributed to it, while at the same time being capable of a stable, secure and comfortable ride, whether loaded or unloaded.

The foregoing, as well as several other features and advantages, will become apparent from the following detailed description of a preferred embodiment, read in conjunction with the drawings, wherein:

THE DRAWINGS

FIG. 2 is a pictorial view of the trailer of FIG. 1, shown in its "squatdown", or load and unload mode;

FIG. 3 is an overhead plan view, partially sectioned, of a vehicle such as shown in FIG. 1, illustrating certain other features of the invention;

FIG. 4 is a side elevation of a portion of the vehicle of FIG. 1, illustrating the interrelationship of certain parts of the suspension system of the present invention;

FIG. 5 is a depiction of FIG. 4 with the suspension system in the "squatdown" mode;

FIG. 6 is a sectional view of the frame rail of a vehicle constructed in accordance with the present invention;

FIG. 8 is illustrative of an enclosed vehicle as an alternative to the vehicle of FIG. 1;

DESCRIPTION OF A PREFERRED EMBODIMENT

Figure 1:
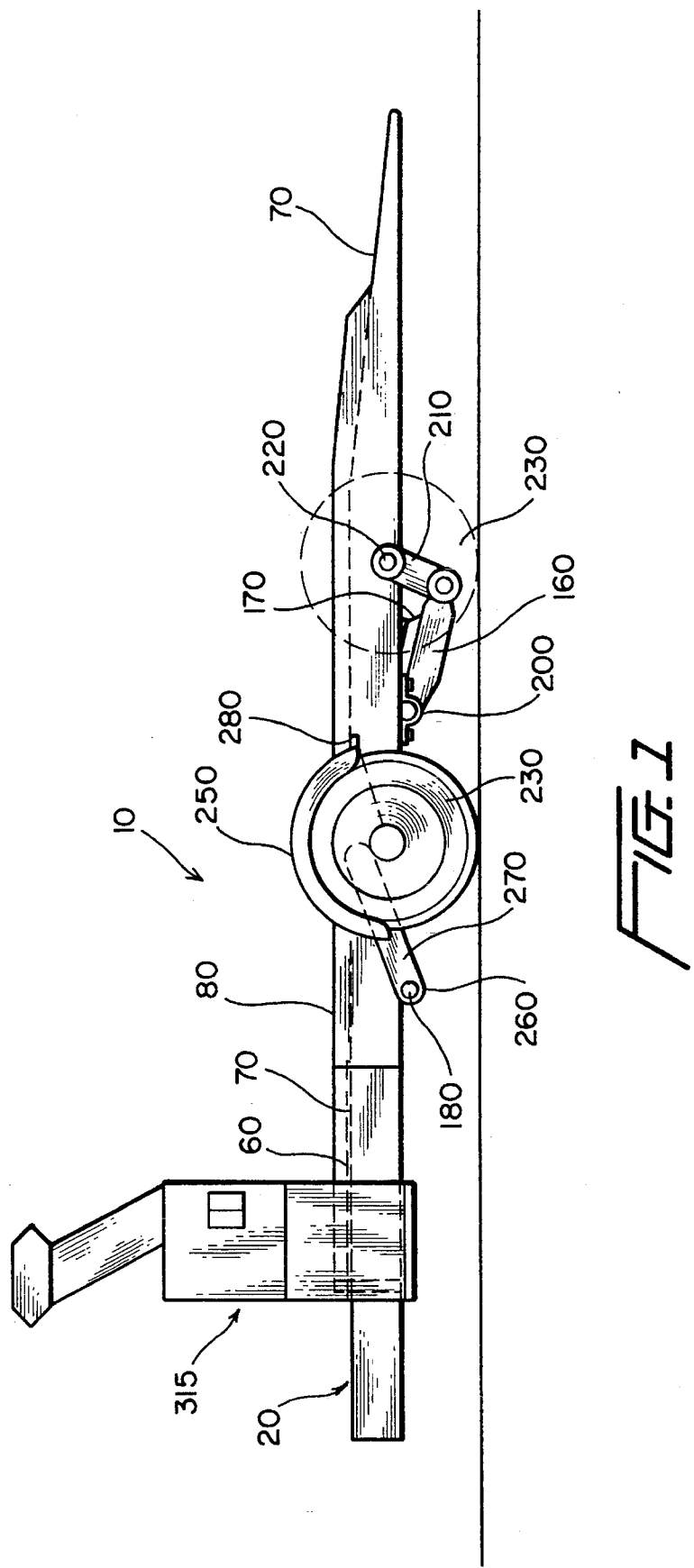
FIG. 1 is a pictorial representation of a flat bed trailer equipped with a plurality of modular suspension units constructed in accordance with the present invention, and depicted in its transport mode.

With reference now to the drawings, and initially to FIG. 1, a vehicle 10 constructed in accordance with the present invention is illustrated in one of its several configurations. More specifically, the FIG. 1 configuration is a towable flatbed trailer device. As will be apparent from the following description, the several novel facets of the present invention, are no less applicable to a flatbed truck, or a covered truck or trailer, such as seen if FIG. 8.

The vehicle of the present invention necessarily includes a main frame 20, which may be towable, or an integral part of a powered vehicle.

The main frame 20, which defines the load carrying area of the vehicle, includes, as illustrated, deck members 60 and 70, respectively. With side supports 80 disposed outboard of the deck members 70, the deck members 60 and 70 are load bearing members, upon which cargo to be hauled may be loaded and secured in any number of well known ways. The structural integrity of the bed area of the truck is assured by providing structural cross members, such as deck members 100. The main frame members themselves may be constructed in a variety of ways without departure from the invention, although it has been found that the structure depicted in FIG. 6 is particularly effective. In reference to FIG. 6, the main frame is shown in cross section, as comprising a high tensile strength, generally rectangular, tubing 120, partially surrounded by a C-shaped frame member 130. The frame members 120 and 130 are capable of controlled limited relative movement, for reasons which will be discussed hereinafter, and in order to facilitate such movement, a series of low friction bearing elements 140 are disbursed between the two members. The elements 140 may be of, or coated with any suitable material, such as TEFLON®, since the elements are not normally subjected to high loading.

Perhaps the single most compelling feature of the present invention is the provision of a unitized wheel and suspension system, illustrated in some detail in FIGS. 4 and 5, and referred to herein as a modular, independent wheel, air bag suspension system 145, also sometimes referred to herein, for sake of brevity as the modular unit.

The modular unit 145 is so designed and constructed in opposed pairs as to be mountable, in any of several well known ways, to almost any frame as an aftermarket product, and of course, is ideally suited to original equipment installation. Moreover, by virtue of its modular nature, installation, wherever made, is readily accomplished in a minimum of time and expense.

As is evident from the drawings, and in keeping with the objectives of the invention, each modular unit 145 employs air bags rather than the more common shock absorbers, or McPhearson struts. In order to support the air bag arrangement, the modular unit 145 includes an upper air bag bracket 150, and a lower air bag bracket 160, disposed beneath, and in face to face relation with the upper bracket 150.

Figure 7:
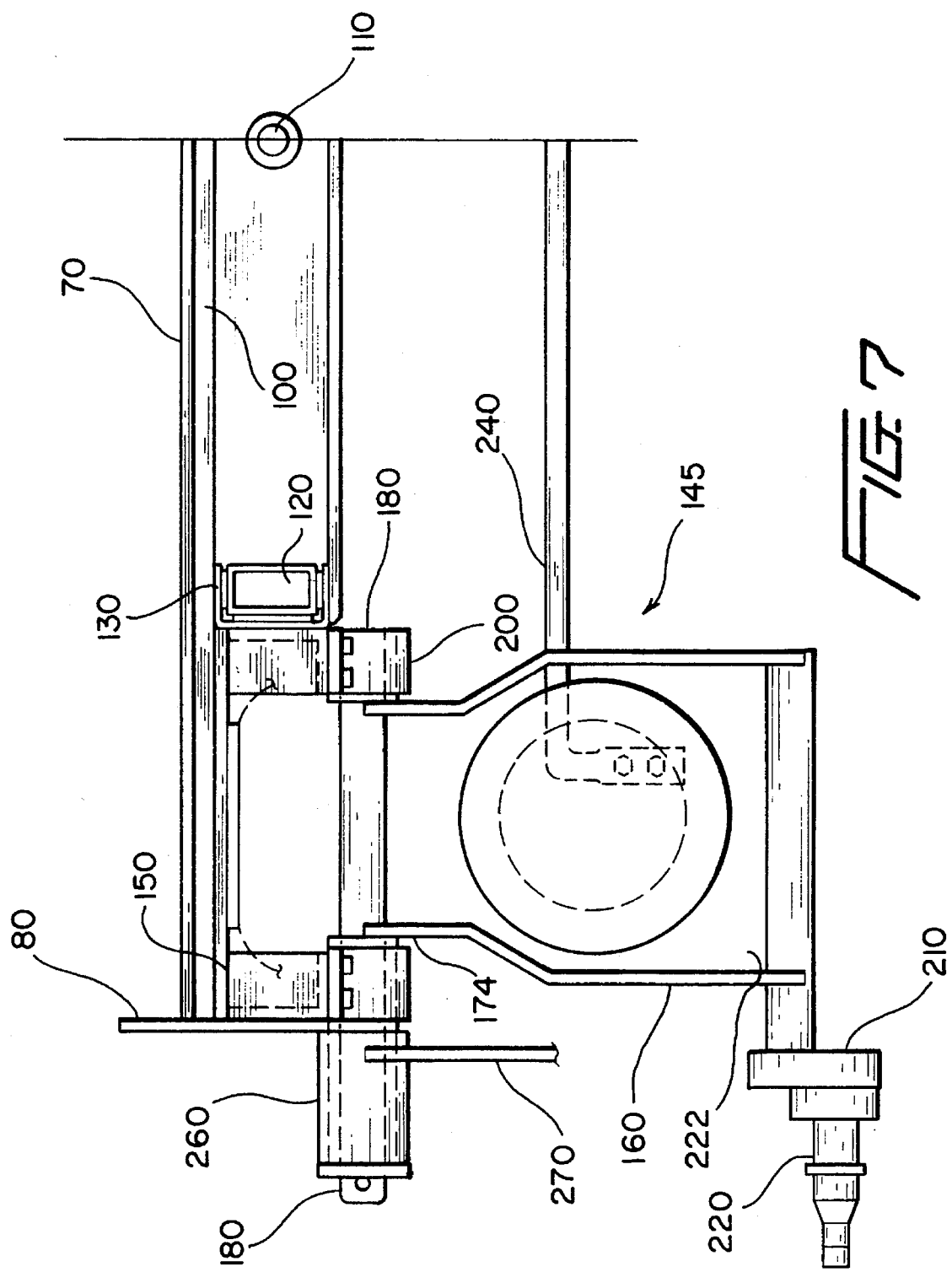
FIG. 7 is a plan view of a portion of the suspension system of the present invention, with the air bag removed to show the lower bracket in relation to the spindle.

As may be best seen in FIGS. 4 and 7, the upper bracket 150 is affixed to the mainframe 20, in any well known manner, and is intended to receive and secure the upper end of an air bag 170. The lower air bag bracket 160 is adapted to receive and secure the lower terminus, or end, of the air bag 170, thereby sandwiching the air bag 170 between the two brackets which hold it in position, to function both as a shock absorber, in the transport mode, (FIG. 4), when a load is being moved from one point to another, and as a kind of "elevator", in the squatdown mode, (FIG. 5), wherein the mainframe of the vehicle is raised and lowered.

With particular reference to FIG. 4, the upper bracket 150, and lower bracket 160, are in keeping with the invention, joined at their respective leading ends, 172 and 174, respectively. For purposes of this description, the term "leading" references the direction of forward movement of the vehicle 10.

The juncture of the brackets is such that the lower bracket 160 is rotatable, or swiveled, about the leading end 172 of the upper bracket 150. The desired relative motion is accomplished by means of a pillow block type bearing arrangement 200, affixed at the leading edge of the upper bracket 150, and the leading edge 172 is formed with a shaft receiving opening, not specifically shown, which is engaged, in bearing relation, by a shaft 180, in the pillow block 200. A circular bearing 190 is pressed, or otherwise secured in the pillow block, to permit limited rotation of the lower bracket 160 about the shaft in a relatively frictionless manner.

The upper air big bracket 150 is designed to support the top part of the air bag 170 and is the main support of the pillow block 200 that holds the swivel shaft 180. The lower air bag bracket is attached to the swivel shaft 180 to extend rearwardly of the swivel shaft and substantially parallel to the side support 80 when viewed from above, as seen in FIG. 7.

As previously alluded to, the capacity of the present invention to squat down to a very low profile, and to present a "ramp" to ground having a very low included angle, makes any vehicle equipped with the modular system of the present invention extremely easy to load and unload from ground level, with a minimum effort, and without the aid of loading docks or power equipment. Moreover, such vehicles can receive and transport very low profile vehicles, whereas lack of clearance has previously been a significant deterrent.

In accomplishing these goals, it is necessary to be able to lower the trailing end of the truck bed to the ground at an exceptionally shallow angle. For example, a 15' long bed may be lowered to provide an included angle $\alpha$ of 2.4° and an 18' bed as much as 2°, depending on the location of the modular units. Because, however, the vehicle must have a specific minimum road clearance in its transport mode, special problems arise. These problems are overcome, in accordance with the invention, by having the capacity to selectively lower the main frame 20 from its transport mode height to a position below the height of the spindle 220 upon which the wheels 130, of the opposed pairs of modular units 145, are mounted, as best seen in FIG. 5.

To accomplish proper lowering of the main frame 20, and coincidentally, the truck bed, each modular unit 145 employs an upright spindle arm, or link, 210. The link 210 is secured to the trailing end 222, of the lower bracket 160, in any well known manner, at its lower end 224, while its upper end 226 engages, and is rotatable relative to the spindle 220.

As shown best in FIG. 7, the spindle arm 210 is attached on the outboard side and substantially parallel to side support 80. The spindle 220 is bolted outwardly of and on the spindle am 210 with caste-camber-toe in-toe out adjustment shims in positions. FIGS. 1 and 4 show the respective positions of spindle arm 210 and spindle 220 in the transport mode, while FIGS. 2 and 5 show the respective positions of the spindle arm 210 and the spindle 220 in the squatdown mode.

In reference to FIG. 5, it will be seen that the link 210 controls the position of the lower bracket 160. A control system, indicated generally as 315, is provided for inflating and deflating the air bags. The control system may include a compressor, or employ gas bottles, depending on the needs of the operator, and is so constructed as to permit the air bags of each modular unit to be inflated or deflated to a precise pressure for each particular task.

Accordingly, when the air bag is deflated, therefore, the lowering of the main frame 20 is accomplished to a position as therein shown, thereby creating a very soft slope which serves as a ramp for the loading and unloading of cargo. The ramp angle may also be altered somewhat by placement of modular units at various distances from the forward end of the bed, which, of course, remains at a height necessary for road clearance, whether it is attached to a motorized vehicle, or whether it is, itself, powered.

The ramp angle is further adjustable by providing the vehicle 10 with a telescoping bed. Thus, in reference to FIG. 3, the present invention contemplates the provision of a telescoping deck 70, which is extensible relative to the main frame, and whose movement is controlled by a hydraulic ram arrangement 110. In order to close any gap resulting from the extension of the telescoping deck 70, a sliding deck 60 is provided which slides into place in the gap.

It is a feature of the present invention that the modules be independently mounted, which permits a high degree of flexibility in customizing each vehicle. On the other hand, in most circumstances, each modular unit 145 is installed in pairs on opposite sides of the deck. Absent some communication between operative pairs of modular units, discrepancies in the gas supply to the air bags, or an imbalance in loading, could result in the unacceptable sagging of one side or the other of the decking, which would not only torque, and thus stress, the main frame, but could result in a load shift, to the extreme detriment of the operator.

To obviate this series of problems, and since uniform air pressure in the air bags does not necessarily assure a level bed, there is provided, as seen in FIG. 7, a torsion bar system, represented by sway bar 240. The sway bar spans the distance between opposed pairs of modular units 145, as seen in FIG. 3, interconnecting the lower brackets 160 of each. In this manner, a displacement on one side or the other is sensed and adjusted to keep the deck, and thus the load, level. Controlled pressure in the individual air bags may be used as an assist to leveling of the bed.

In yet another aspect of the invention, and again referring to FIG. 7, fenders 250 (FIG. 3) are disposed above the wheels 230 of each modular wheel assembly, and are operable therewith to move through a limited arc with inflation and exhaustion of the air bags. Thus, a fender support arm 270 is affixed at one end to a fender swivel support 260, which rotates as the lower bracket 160 rotates. The fender 250 is attached to the other end of the arm 270, and moves between a position above the wheels in the transport mode, to a position on the wheels when the vehicle is in the squat mode.

On the rearmost portion of the fender 250 (FIG. 2) is a fender horizontal support plate 280 that supports the rear portion of the fender 250 whenever the vehicle is in the loaded and transport mode of operation. This method of attachment is necessary because of the air bag suspension system 145. The attachment of the fender swivel support 260 and the fender swivel support 260 and the fender support arm 270 is shown in FIG. 7. The fenders 250 are hinged to the subframe 130, rather than an axle, to give an aesthetically pleasing look to the vehicle, as well as to provide a more secure attachment. As the deck member 70 is lowered to the ground, the fenders 250 come in contact with the top of the tire 230, and since both the fender and the tire are hinged from the same horizontal plane, they both rotate forward, as shown in FIG. 5.

Inflation and exhaustion of the air bags is designed so as to be remotely, or manually operable. By providing either a gas supply, such as nitrogen in a bottle, or an air compressor, both of which are schematically represented at 320, as part of the control system 315, all of which are well known in the industry, the entire operation of the vehicle can be accomplished from the truck cab, or by putting the controls on an umbilical cord, from any remote position.

Having described a preferred embodiment of the invention, and some variations on aspects thereof, what is claimed is:

1. In a vehicle having a frame and including a load receiving area disposed on said frame, said vehicle having at least one pair of parallel modular wheel assemblies mounted opposite one another to the frame thereof, said modular wheel assemblies being disposed in axial alignment such that the axes thereof form a line perpendicular to the longitudinal axis of said vehicle;

each said modular wheel assembly comprising, in combination:

a wheel; said wheel being rotatably disposed on an axle;

an air bag suspension system; said air bag suspension system being disposed between said frame of the vehicle and said axle and attached to both;

said suspension system including an upper bracket member fixed relative to the frame of said vehicle:

a lower bracket member, said lower bracket member being pivotally mounted at one end to said upper bracket member so as to be rotatable relative to said upper bracket member:

an air bag device comprising at least one elastic bladder capable of being inflated and deflated, said bladder being disposed between said upper bracket member and said lower bracket member and having upper and lower termini affixed respectively to said upper and lower bracket members;

an upright spindle arm disposed between said lower bracket and said axle, said upright spindle arm being attached to said lower bracket member at an end thereof opposite said pivotally mounted end; and means for selectively deflating said bladder to thereby lower the vehicle frame to a position below said axle of said wheel wherein a fender is provided above each said modular wheel assembly, each said fender being interconnected with its respective modular wheel assembly such that when said frame of said vehicle is lowered, said fender moves into contact with said wheel thereof to protect the same during loading.

\* \* \* \* \*